United States Patent
Tabak et al.

(10) Patent No.: US 9,407,824 B2
(45) Date of Patent: Aug. 2, 2016

(54) MULTI-DIRECTIONAL CONTENT CAPTURE ON MOBILE DEVICES

(71) Applicant: Google Inc., Mountain View, CA (US)

(72) Inventors: Joshua Abraham Tabak, San Francisco, CA (US); Jason Toff, San Francisco, CA (US); Reed G A Morse, Palo Alto, CA (US); Christopher Peter Rhodes, San Francisco, CA (US); Molly Castle Nix, San Francisco, CA (US); John Gregg, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 22 days.

(21) Appl. No.: 13/842,706

(22) Filed: Mar. 15, 2013

(65) Prior Publication Data
US 2014/0118597 A1 May 1, 2014

Related U.S. Application Data

(60) Provisional application No. 61/721,428, filed on Nov. 1, 2012.

(51) Int. Cl.
*H04N 5/232* (2006.01)
(52) U.S. Cl.
CPC ....... *H04N 5/23293* (2013.01); *H04N 5/23222* (2013.01)
(58) Field of Classification Search
None
See application file for complete search history.

(56) References Cited

U.S. PATENT DOCUMENTS

| | | | |
|---|---|---|---|
| 2008/0079689 A1* | 4/2008 | Koskinen | 345/156 |
| 2008/0270890 A1 | 10/2008 | Stern | |
| 2009/0002797 A1 | 1/2009 | Kwong et al. | |
| 2009/0284637 A1* | 11/2009 | Parulski | H04N 1/00183 348/333.12 |
| 2010/0149377 A1* | 6/2010 | Shintani et al. | 348/231.5 |
| 2011/0312349 A1* | 12/2011 | Forutanpour et al. | 455/466 |
| 2011/0312374 A1 | 12/2011 | Chen et al. | |
| 2012/0026135 A1* | 2/2012 | Alberth et al. | 345/177 |
| 2012/0062757 A1* | 3/2012 | Schindler | 348/220.1 |
| 2012/0120220 A1* | 5/2012 | Al-Moosawi | 348/77 |
| 2012/0206568 A1 | 8/2012 | Han | |
| 2012/0212410 A1* | 8/2012 | Ikenoue et al. | 345/156 |
| 2013/0035081 A1* | 2/2013 | Sanger | G06K 9/228 455/414.2 |

OTHER PUBLICATIONS

The International Search Report and Written Opinion of the International Searching Authority for International Patent Application No. PCT/US2013/066442 mailed on Jan. 17, 2014.

* cited by examiner

*Primary Examiner* — Shahbaz Nazrul
(74) *Attorney, Agent, or Firm* — Lowenstein Sandler LLP

(57) ABSTRACT

Systems and methods for facilitating content capturing on a mobile device are provided. The current position of a mobile device is identified during a content capturing preparation stage. The current position of the mobile device can correspond to a first position or a second position. The first position is a preferred position for capturing content as compared to the second position. When the current position of the mobile device corresponds to the second position, a prompt can be provided on the mobile device to instruct a user of the mobile device to move the mobile device to the first position.

20 Claims, 5 Drawing Sheets

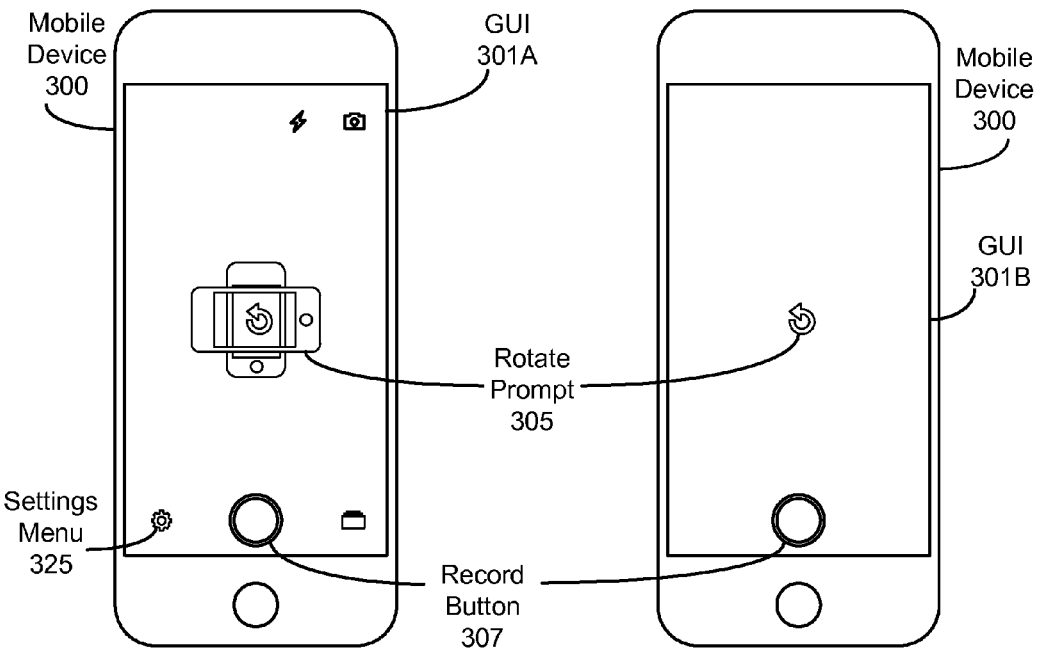
FIGURE 3A
FIGURE 3B
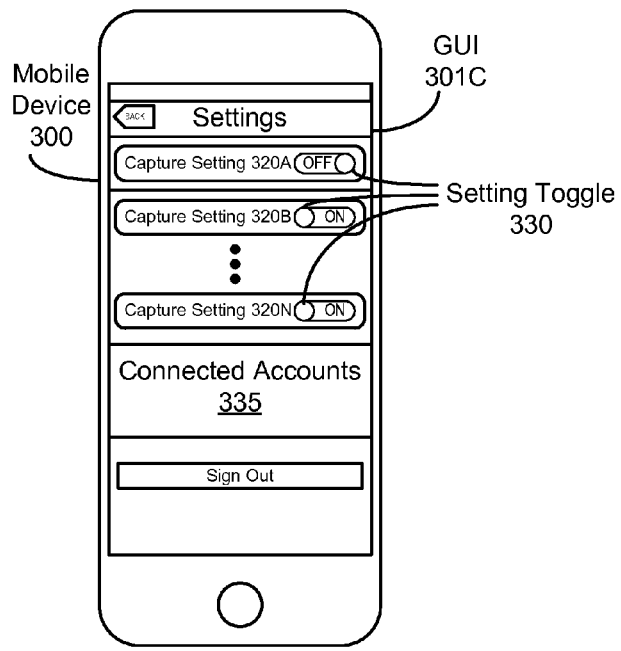
FIGURE 3C

MULTI-DIRECTIONAL CONTENT CAPTURE ON MOBILE DEVICES

RELATED APPLICATION

This application claims priority to U.S. Provisional Patent Application No. 61/721,428, filed Nov. 1, 2012, which is herein incorporated by reference.

TECHNICAL FIELD

The present disclosure relates to capturing content and, more particularly, for facilitating multi-directional content capture on a mobile device.

BACKGROUND

Recent advancements in technology have led to consolidating many different functions into a single mobile device. Users no longer need to carry a different device for performing different functions. To give a few examples, mobile devices can perform functions similar to those of phones, cameras, calculators, calendars, maps, contact lists, and alarm clocks, etc. However, mobile devices can often record videos that have suboptimal characteristics when played back on a television. Mobile devices are conducive to being held vertically and thus users often record video while holding mobile devices vertically. Televisions, however, typically produce the best results when playing videos that were recorded by devices in a horizontal position. Additionally, although conventional mobile devices can offer a wide range of functionality, actually performing the functions can sometimes be time intensive and can involve unnecessary operations.

SUMMARY

In some implementations, a computer-implemented method for facilitating multi-directional content capture on a mobile device is presented. The method includes identifying a current position of a mobile device during a content capturing preparation stage. The method also includes determining whether the current position of the mobile device corresponds to a first position or a second position. The first position is a preferred position for capturing content as compared to the second position. The method further includes providing, by the mobile device, a prompt to instruct a user of the mobile device to move the mobile device to the first position when the current position of the mobile device corresponds to the second position. The method includes refraining from providing the prompt when the current position of the mobile device corresponds to the first position.

In another implementation, a method includes automatically initiating the capturing of content. The content is at least one of audio, video, or an image. In a further implementation, a method includes causing content capturing capability on the mobile device to be blocked when the current position of the mobile device corresponds to the second position.

In yet another implementation, the method includes identifying a change in the current position of the mobile device from the second position to the first position and causing a content capturing capability on the mobile device to be unblocked.

In aspects, the change in the current position of the mobile device is a rotation from the second position to the first position.

In a further implementation, when identifying the change in the current position of the mobile device, the method includes identifying a reference point for the current position of the mobile device using a content capture component of the mobile device, monitoring the reference point using the content capture component of the mobile device, and identifying a deviation from the reference point.

In another implementation, when identifying the change in the current position of the mobile device from the second position to the first position, the method includes detecting a rate of change in the current position of the mobile device, and when the rate of change is above a threshold, the method includes modifying a predefined content capturing property.

In yet a further implementation, the method further includes modifying an aspect ratio of the content when the content is captured by the mobile device in the second position.

In some implementations, an apparatus includes means for identifying a current position of a mobile device during a content capturing preparation stage. The apparatus also includes means for determining whether the current position of the mobile device corresponds to a first position or a second position. The first position is a preferred position for capturing content as compared to the second position. The apparatus further includes means for providing, by the mobile device, a prompt to instruct a user of the mobile device to move the mobile device to the first position when the current position of the mobile device corresponds to the second position. The apparatus also includes means for refraining from providing the prompt when the current position of the mobile device corresponds to the first position.

In another implementation, the apparatus includes means for automatically initiating the capturing of content. In a further implementation, the apparatus includes means for causing content capturing capability on the mobile device to be blocked when the current position of the mobile device corresponds to the second position.

In yet another implementation, the apparatus includes means for identifying a change in the current position of the mobile device from the second position to the first position and causing a content capturing capability on the mobile device to be unblocked.

In a further implementation, when identifying the change in the current position of the mobile device, the apparatus includes means for identifying a reference point for the current position of the mobile device using a content capture component of the mobile device, means for monitoring the reference point using the content capture component of the mobile device, and means for identifying a deviation from the reference point.

In another implementation, when identifying the change in the current position of the mobile device from the second position to the first position, the apparatus includes means for detecting a rate of change in the current position of the mobile device, and when the rate of change is above a threshold, the apparatus includes means for modifying a predefined content capturing property.

In yet a further implementation, the apparatus includes means for modifying an aspect ratio of the content when the content is captured by the mobile device in the second position.

In additional implementations, computing devices for performing the operations described above are also implemented. Further, in some implementations, a computer readable storage medium is provided to store instructions causing a processing device to perform the operations described above.

BRIEF DESCRIPTION OF THE DRAWINGS

The present disclosure will be understood more fully from the detailed description given below and from the accompanying drawings of various implementations of the disclosure.

FIGS. 3A-3C illustrate example graphical user interfaces, according to various implementations.

DETAILED DESCRIPTION

Described herein is a mechanism for facilitating multi-directional content capture on a mobile device. Many people use their mobile devices to capture content (e.g., record video, record audio, take pictures). Since mobile devices are typically operated in a portrait orientation (i.e., with the shorter sides of a rectangular device being at the top and bottom), many people record video or take pictures on their mobile devices while holding the device in portrait orientation. Common display devices (e.g., TVs, computer monitors, etc.), however, have landscape screens, meaning the longer sides of the rectangular device are at the top and bottom. When a portrait video is played on a landscape screen, black bars with no video content occupy substantial amounts of the screen space to the left and right of the vertical/portrait video content. This is sometimes referred to as "vertical video syndrome."

Further, initiating the content capturing process on a conventional mobile device can be slow and can take many operations. An example sequence of operations can include: (1) turn on the mobile device, (2) find a content capturing application, (3) open the content capturing application, (4) navigate one or more menus to find the record mode, (5) adjust a user grip on device, (6) find the begin record button, and (7) begin recording.

Aspects of the present disclosure address the above deficiencies of conventional mobile devices by prompting users to change a current position of a mobile device when the current position is not a preferred position for content capturing. The content can be, for example, audio, video, images, etc. In some implementation, a mobile device identifies a current position of the mobile device during a content capturing preparation stage of the mobile device. The mobile device determines whether the current position of the mobile device corresponds to a preferred position for capturing content. When the current position of the mobile device does not correspond to the preferred position, the mobile device provides a prompt to instruct a user of the mobile device to move the mobile device to the preferred position. When the current position of the mobile device corresponds to the preferred position, the mobile device refrains from providing the prompt. As a result, content capturing capability and functionality of mobile devices are improved.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
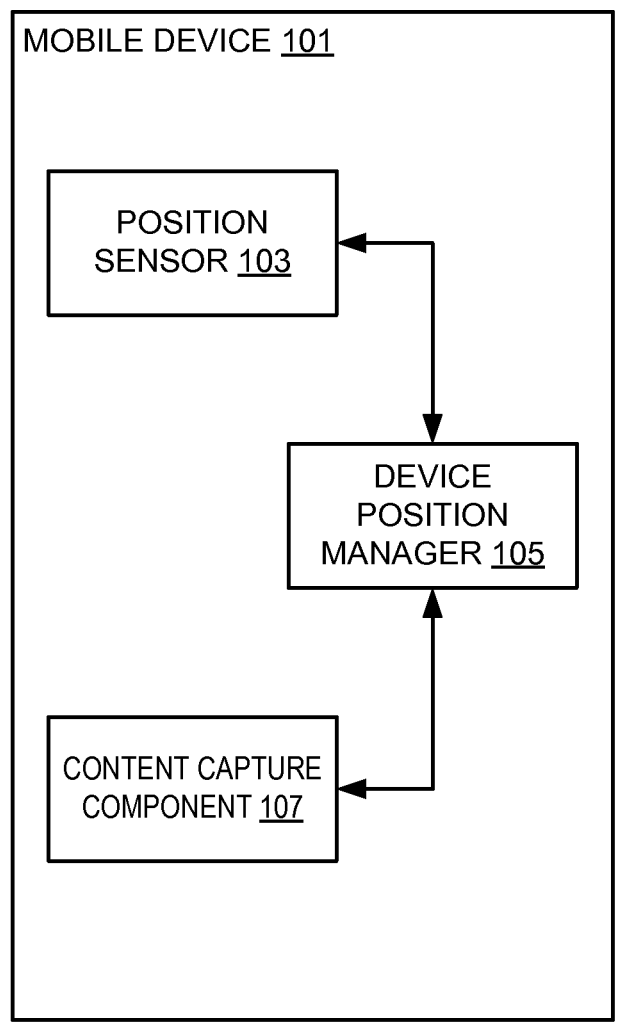
FIG. 1 illustrates an example mobile device, in accordance with various implementations of the present disclosure.

FIG. 1 illustrates example mobile device 101 providing improved content capturing capability in accordance with some aspects of the present disclosure. The mobile device 101 can be a portable computing device, such as, and not limited to, a cellular telephone, a personal digital assistant (PDA), a portable media player, a netbook, a laptop computer, an electronic book reader, a tablet computer, and the like. The mobile device 101 can run an operating system (OS) that manages hardware and software of the mobile device 101. The mobile device 101, the OS and modules within the OS can perform various operations, such as facilitating multi-directional content capture. Mobile device 101 can include one or more position sensors 103, device position manager 105 and content capture component 107 (e.g., a charge coupled device (CCD) image sensor, a complimentary metal oxide semiconductor (CMOS) image sensor, a microphone, etc.). Alternatively, the functionality of one or more of the position sensor 103, device position manager 105 and content capture component 107 may be combined into a single module, or may be divided into additional modules.

One or more position sensors 103 can detect spatial and motion characteristics of the mobile device 101. Spatial characteristics that the position sensor 103 can detect include those of the position of the mobile device 101. In one implementation, the position sensor 103 detects the orientation of the device by detecting an angle from a horizontal plane. For example, the position sensor 103 can detect when the mobile device 101 is in landscape or portrait orientation. Motion characteristics that the position sensor 103 can detect include movement, speed, and acceleration of the mobile device 101 as it changes position or orientation. In one implementation, the position sensor 103 can detect linear velocities and accelerations (e.g., translational movement) and angular velocities and accelerations (e.g., rotational movement). The position sensor 103 may include an accelerometer and/or a gyroscope that detects the spatial and motion characteristics of the mobile device 101. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor 103. The position sensor 103 in one implementation is a micro-electromechanical systems (MEMS) sensor.

In one implementation, the position sensor 103 outputs fully processed signals to the device position manager 105. The signals can correspond to spatial and motion characteristics of the mobile device 101. For example, the position sensor 103 may output a distance, a detected/not detected signal, etc. using a single line interface or a multi-line interface. Similarly, position sensor 103 may output an acceleration value (e.g., in Gs). In another implementation, the position sensor 103 outputs, for example, positional data (e.g., an orientation of the mobile device 101) and/or motion data (e.g., a change or a rate of change in position or orientation of the mobile device 101) to the device position manager 105 without first processing the data. Similarly, position sensor 103 may output, for example, voltage values that can be interpreted by the device position manger 105 as positional or acceleration values.

The device position manager 105 can use the spatial characteristics of the mobile device 101 to cause the mobile device 101 to perform or omit different functions. Device position manager 105 can use spatial data or signals received from position sensor 103 to control or block operations of the mobile device (e.g., operations of the content capture component 107).

The device position manager 105 can interpret data or signals received from the position sensor 103 to identify a position (e.g., orientation) of the mobile device 101. Using the received signals, the device position manager 105 can determine whether the mobile device is in the preferred position for capturing content. When the mobile device 101 is in a first position, (e.g., a preferred position for capturing content as compared to a second position) the device position manager 105 can permit the content capture component 107 to capture content (e.g., record a video, take a picture, record audio). When the mobile device is in the second position, the device position manager can block the content capture component 107 from capturing content. For example, content capturing capability on the mobile device 101 can be blocked when the mobile device 101 is in portrait orientation and enabled when the mobile device 101 is in landscape orientation.

In one implementation, depending on the detected position of the mobile device 101, the device position manager 105 can provide a prompt to instruct a user of the mobile device 101 to move the mobile device 101 to another position. For example, when in the mobile device 101 is in portrait orientation, the prompt can instruct the user to move or rotate the mobile device 101 to landscape orientation.

In addition, the device position manager 105 can also identify motion characteristics of the mobile device 101 (e.g., movement from one position to another, linear and angular acceleration) using the motion data or signals received from the position sensor 103. The device position manager 105 can use the motion characteristics of the mobile device 101 to cause the mobile device 101 to perform different functions, such as enabling or blocking features or components of the mobile device 101. For example, when the mobile device 101 is rotated from portrait to landscape orientation, the device position manager 105 can automatically initiate content capturing, such as by a camera, microphone, and the like. This can speed up and simplify content capturing initialization operation to be performed by a user to two operations: open an application for content capturing on the mobile device 101 and rotate the mobile device 101 from portrait to landscape orientation to begin recording content. Additional examples of functions of the device position manager 105 are described in conjunction with FIG. 2.

The device position manager 105 may include sensor circuitry (e.g., sensor device drivers) that enables the device position manager 105 to interpret signals received from the position sensor 103. The device position manager 105 may use the sensor circuitry to process and/or interpret the received data. If data is received from multiple position sensors 103, processing the data may include averaging the data, identifying a maximum from the data, or otherwise combining the data from the multiple sensors.

Content capture component 107 can be responsible for capturing content (e.g., video, image, audio) and can be, for example, an image sensor, camera, video camera, microphone, or a combination thereof.

In one implementation, the content capture component 107 (e.g., an image sensor, camera) of the mobile device 101 can be used to detect spatial and motion characteristics of the mobile device 101, and a separate position sensor 103 may not be needed. The image sensor or camera can identify a reference point (e.g., a horizontal plane) for a current position of the mobile device and monitor the reference point for any deviations. When the image sensor or camera detects a deviation, it can notify the device position manager 105.

Figure 2:
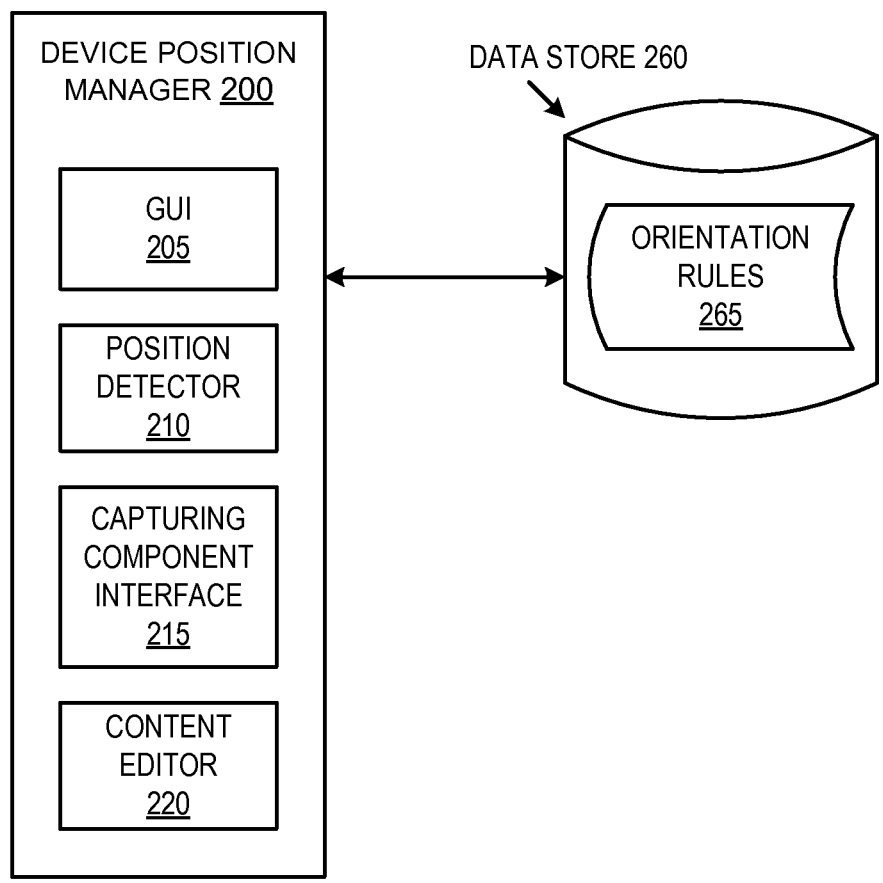
FIG. 2 is a block diagram of a device position manager, in accordance with various implementations.

FIG. 2 is a block diagram of a device position manager 200, in accordance with one implementation of the present disclosure. The device position manager 200 can include a graphical user interface (GUI) 205, a position detector 210, a capturing component interface 215, and a content editor 220. In alternative implementations, the functionality of one or more of the GUI 205, position detector 210, capturing component interface 215, and content editor 220 may be combined or divided into additional components.

GUI 205 can be an interface that permits a user to interact with a mobile device 101 and can be provided by a mobile application. A user can view information presented by GUI 205 and can provide input via GUI 205. GUI 205 can display text, images, or icons and can include one or more user interface tools. As the term is used herein, a user interface tool refers to any single graphical instrument or combination of graphics controls that permit a user to input information to a computer system. Common conventional user interface tools include visual output for one or more buttons, text boxes, scroll bars, pictures, spin dials, list boxes, search boxes, select options, etc.

GUI 205 can be an interface for content capturing activities on a mobile device, such as for capturing video. A user can interact with a record button, for example, to initiate a content capture process. GUI 205 can also provide a prompt to the user of the mobile device 101 based on position or orientation of the mobile device. The prompt, for example, can instruct the user to move the mobile device 101 from one position to a preferred position at the time of a content capture event, when the user is less likely to ignore or forget the prompt. The prompt may be via a visual means, an audible means or a combination of the above. In one implementation, when the mobile device 101 is moved from a non-preferred position to a preferred position, the GUI 205 can refrain from providing the prompt. For example, when the mobile device 101 is in the portrait orientation, GUI 205 can provide a prompt to instruct the user to move the mobile device in any direction that results in the mobile device 101 being substantially in a landscape orientation (e.g., a position in which the mobile device does not deviate from landscape orientation by more than a threshold value, such as ten percent). When the mobile device is moved to the preferred position, GUI 205 can refrain from providing the prompt or can stop providing the prompt if the prompt was provided before. Examples of additional aspects of GUI 205 are described in further detail below in conjunction with FIGS. 3A and 3B.

Position detector 210 can determine the current position and subsequent changes in the position or orientation of the mobile device 101. To determine the current position of the mobile device 101, position detector 210 can receive signals that correspond to spatial and motion characteristics of the mobile device 101 (e.g., a position, an orientation, a change in position, a velocity, a rotation, an acceleration, etc.) from one or more position sensors 103. In one implementation, position detector 210 receives a fully processed signal from position sensor 103. In another implementation, position detector 210 receives an unprocessed or a partially processed signal from position sensor 103 and then processes the signal to determine a position or orientation of the mobile device 101. For example, position detector 210 can determine whether the mobile device 101 is in a portrait orientation or in a landscape orientation. Position detector 210 can also determine the acceleration of the mobile device 101 that occurs during a change from one position to another. The position detector 210 can determine the current position of the mobile device 101 at any time, including at the time the user opens a content capture application on the mobile device 101.

Once the position or orientation of the mobile device 101 is determined, the position detector 210 can inform other components of the device position manager 200 of positional characteristics of the mobile device 101. For example, position detector 210 can inform GUI 205 of the position of the mobile device 101 such that GUI 205 can display a prompt to the user based on the position. In another example, position detector 210 informs the capturing component interface 215 of the position of the mobile device 101.

Capturing component interface 215 can control content capture component 107 of the mobile device 101. To control the content capture component 107, capturing component interface 215 can use information about the position or motion of the mobile device 101 received from the position detector 210. If the mobile device 101 is in a first position (e.g., landscape orientation) capturing component interface 215 can signal to the content capture component 107 to start capturing content (e.g., record a video, take a picture, record audio). Similarly, when the mobile device 101 is in a second position (e.g., portrait orientation), capturing component interface 215 can cause content capturing capability on the mobile device 101 to be blocked. When position detector 210 identifies a change in position of the mobile device 101 from the second position to the first (e.g., from portrait to landscape orientation), capturing component interface 215 can cause content capturing capability on the mobile device to be unblocked. In one implementation, if the device is in landscape orientation at the time a video capture application is opened, the device automatically initiates a content capturing process.

In one implementation, if GUI 205 receives an indication from the position detector 210 that the mobile device 101 has changed positions while the mobile device is capturing content, then the GUI 205 can provide the prompt to the user. The prompt can instruct a user of the mobile device to move the mobile device to another position. Further, if capturing component interface 215 receives an indication from the position detector 210 that the mobile device 101 has changed positions away from the preferred position while the mobile device is capturing content, then the capturing component interface 215 can block the mobile device from further capturing content.

In one implementation, device position manager 200 includes a content editor 220. The content editor 220 can modify content (e.g., video, image, audio) according to the position or orientation of the mobile device 101, as determined by orientation detector 210. Content captured while the device is in one position can be modified such that the modification gives the appearance that the content was captured in a different position. For example, when landscape is the desired content capture orientation, the content editor 220 can modify video capture when the mobile device 101 is in portrait orientation. In this example, the content editor 220 can modify an aspect ratio of the video, where the aspect ratio is a proportional relationship between the height and width of the video. When capturing video by a device that is in portrait orientation, the native video input can be cropped to a desired aspect ratio. Desired aspect ratios include, for example, 4:3, 16:9, 1.85:1, 2.39:1, etc.

The device position manager 200 can be communicably connected to a data store 260 that stores orientation rules 265. The data store 260 can be a persistent storage that is capable of storing data and can be part of the mobile device 101. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. Orientation rules 265 define what actions should take place in response to current characteristics of the mobile device or content being captured by the mobile device. For example, orientation rules 265 may specify what operations (e.g., allow or block content capturing, provide a prompt, stop providing a prompt, etc.) should be performed in response to a certain position of the mobile device 101 or in response to a specific movement of the mobile device 101. Another example operation may be modification of predefined content capturing properties when certain device positions or movements are identified. The predefined content capturing property can be, for example, camera capturing state, turning on/off a flash, enabling/disabling a content feature (e.g., red eye correction, image or video filter, etc.), starting/stopping an audio recording, etc. For example, the orientation rules 265 may specify that upon detecting a rate of change in the current position of the mobile device exceeding a specified threshold, the capturing component interface should modify a predefined content capturing property of the camera from a non-capturing state to a capturing state.

Other orientation rules 265 permit different operations depending on the specific detected motion. These orientation rules 265 can also define different operations that depend on the speed or acceleration of detected movements of the mobile device. A fast rotation, for example, can correspond to one action while a slow rotation can correspond to another. In another example, when rotated counter clockwise, the mobile device records video. When rotated, the mobile device can record video turns on a flash. The motion can also activate devices or modules connected via a wired or wireless connection, such as a cable, a Wi-Fi, SMS, Bluetooth, infrared, and the like.

Orientation rules 265 can also require certain operations based on either the initial or final position of the device after a rotation. For example, when a device is rotated a total of ninety degrees, regardless of the start and end position, the mobile device should perform a specified operation. In another example, when the final position of the mobile device is ninety degrees from the horizontal position, the mobile device should perform a first operation, and when the final position of the mobile device is at two hundred seventy degrees from the horizontal position, the mobile device should perform a second operation, etc. Alternatively, the operation to be performed should depend on the direction of the movement. For example, when the mobile device is rotated clockwise, the mobile device should begin recording video, and when the mobile device is rotated counter clockwise, the mobile device should stop recording video.

Orientation rules 265 can also be used to control content playback. Detected movement can correspond to different playback operations. For example, orientation rules 265 can specify whether to start playing video or audio when a rotation is detected. Similarly, orientation rule 265 can specify whether to stop, fast forward, rewind or pause content playback when a rotation is detected.

FIGS. 3A-3C illustrate example GUIs 301 on mobile device 300, according to various implementations. The GUIs 301A, 301B, 301C can be similar to the GUI 205 described in conjunction with FIG. 2. Mobile device 300 can be the same as or similar to the mobile device 101 described in conjunction with FIG. 1.

FIG. 3A illustrates an example GUI 301A for capturing content in accordance with one implementation. GUI 301A displays a rotate prompt 305. The rotate prompt 305 can include text, an image or an icon to instruct a user to move or rotate the mobile device 300 to a different position to start video capture. If the user rotates the device from landscape orientation back to portrait orientation after recording had commenced, for example, an icon and/or text reminder 305 to rotate the device back to landscape orientation would appear on GUI 301A. In one implementation, the video recording stops if the device is positioned such that it is not substantially horizontal (e.g., the device deviates from landscape orientation by more than a threshold value, such as ten percent).

In one implementation, GUI 301A includes a record button 307 that a user toggles to record and stop capturing content. The record button 307 can visually indicate when recording is available or not available to the user depending on the position of the mobile device. For example, the record button 307 can be "greyed out" when the mobile device 300 is in a portrait orientation to indicate to the user that recording is not available in the current mobile device position. GUI 301A can include a setting menu button 325 that, when activated by the user, causes the GUI 301A to present a settings menu, as illustrated in FIG. 3C.

FIG. 3B illustrates an example GUI 301B for capturing content in accordance with another implementation. GUI 301B is an alternate, minimalistic design with rotate indicator or prompt 305 and record button 307. A settings menu button (not shown) can be displayed by GUI 301B when the user touches the screen of the mobile device.

FIG. 3C illustrates an example setting menu GUI 301C for capturing content in accordance with one implementation. GUI 301C can present one or more capture settings 320A-N. The capture settings 320A-N can be used to receive input from a user to enable or disable various features. The various features can enable all or part of the functionality of the device position manager 200. In one implementation, user input received through capture settings 320A-N defines one or more orientation rules 265. For example, using capture setting 320A, a user can request that the mobile device 300 block content capturing when the mobile device 300 is in a portrait orientation. In another example, a capture setting 320B provides for displaying a rotate prompt 305 if the mobile device 300 is not in landscape orientation. In a further example, the user can request that the mobile device 300 automatically initiate video recording when the mobile device 300 is in landscape orientation (e.g., when the mobile device is rotated to landscape orientation, when the device is already in landscape orientation and a video capturing application is opened, etc.). Another capture setting 320 can provide for stopping to record video if the device is rotated to a portrait orientation. A further setting 320 can permit the user to indicate a quality setting (e.g., HD video) for content uploaded to a server. Another setting 320 can allow to upload the video to a server when the video is connected to Wi-Fi. Yet another capture setting 320 can enable or disable the rotate prompt 305. Additional capture settings 320A-N are contemplated and the above examples are not intended to limit the disclosure. The capture settings 320A-N are not mutually exclusive and can be toggled individually or as a group.

Figure 4:
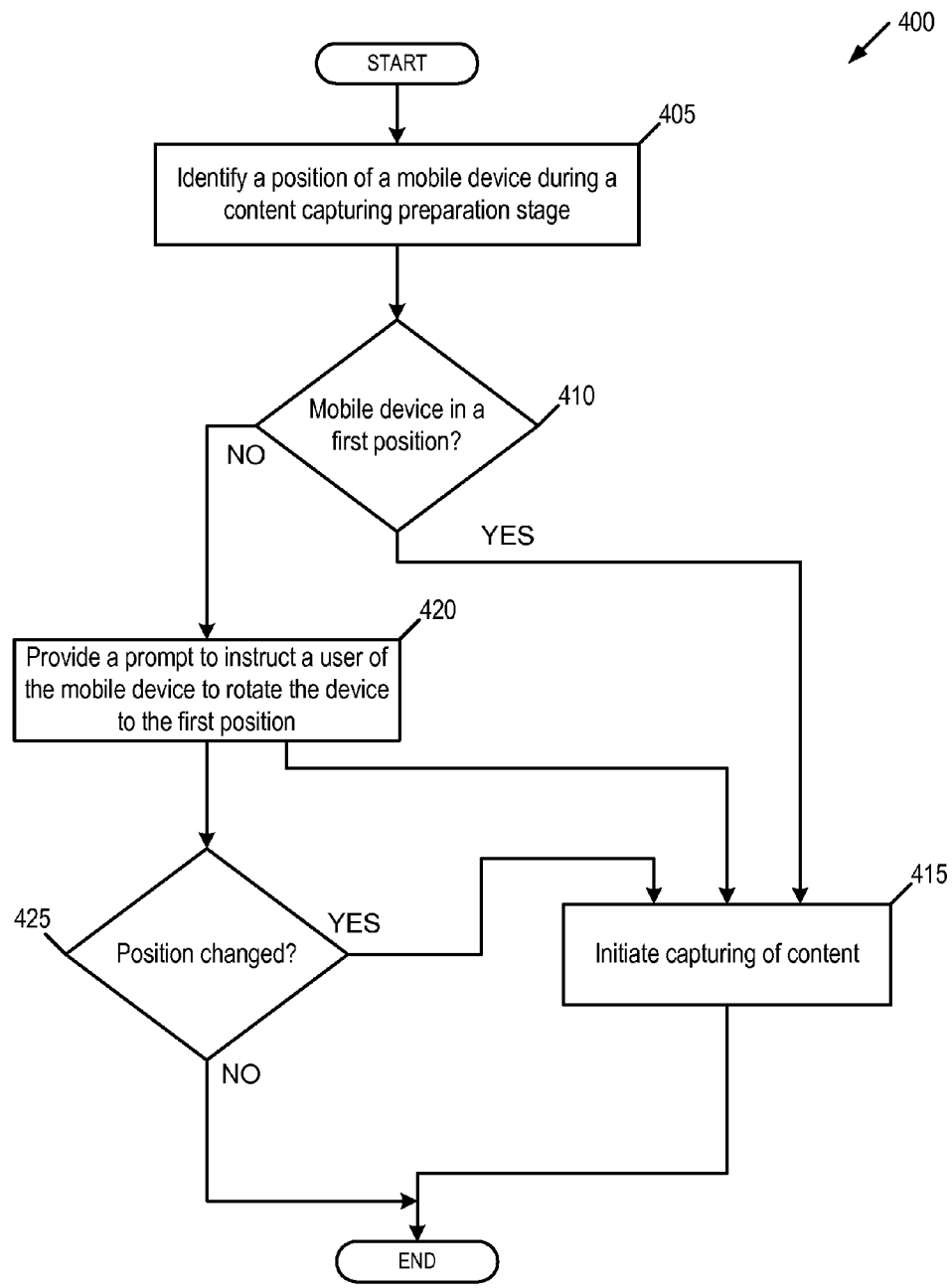
FIG. 4 is a flow diagram of an implementation of a method for facilitating multi-directional content capture on a mobile device.

FIG. 4 is flow diagram of an implementation of a method for initiating capturing of content. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating an implementation of a method 400 for initiating capturing of content. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one implementation, method 400 is performed primarily by device position manager 200 of FIG. 2.

At block 405, processing logic identifies a current position of a mobile device during a content capturing preparation stage. The content capturing preparation stage can refer to a content capturing application (e.g., video or audio recorder, camera) being open but not capturing content. At block 410, processing logic determines whether the current position of the mobile device corresponds to a first position. The first position is a preferred position for capturing content as compared to a second position and in one implementation, the first position can be a landscape orientation. If the mobile device is in the first position, at block 415, processing logic can initiate capturing of content (e.g., automatically, or at the request of a user) and can refrain from providing a prompt to the user of the mobile device.

If at block 410 the mobile device is not in the first position, processing logic at block 420 can provide a prompt to instruct a user of the mobile device to move the mobile device to the first position. In one implementation, after or simultaneous to providing the prompt, processing logic can initiate capturing of content at block 415. Alternatively, in addition to providing the prompt, processing logic causes content capturing capability on the mobile device to be blocked. At block 425, processing logic determines if the position of the mobile device has changed. If not, method 400 ends. If processing logic identifies a change (e.g., a rotation) in the current position of the mobile device from a second position to the first position, processing logic causes content capturing capability on the mobile device to be unblocked. Processing logic can then initiate capturing of content at block 415.

In one implementation, when processing logic identifies the change in the current position of the mobile device at block 425, it identifies a reference point for the current position of the mobile device using a content capture component of the mobile device. Processing logic monitors the reference point using the image sensor of the mobile device and identifies a deviation from the reference point.

Figure 5:
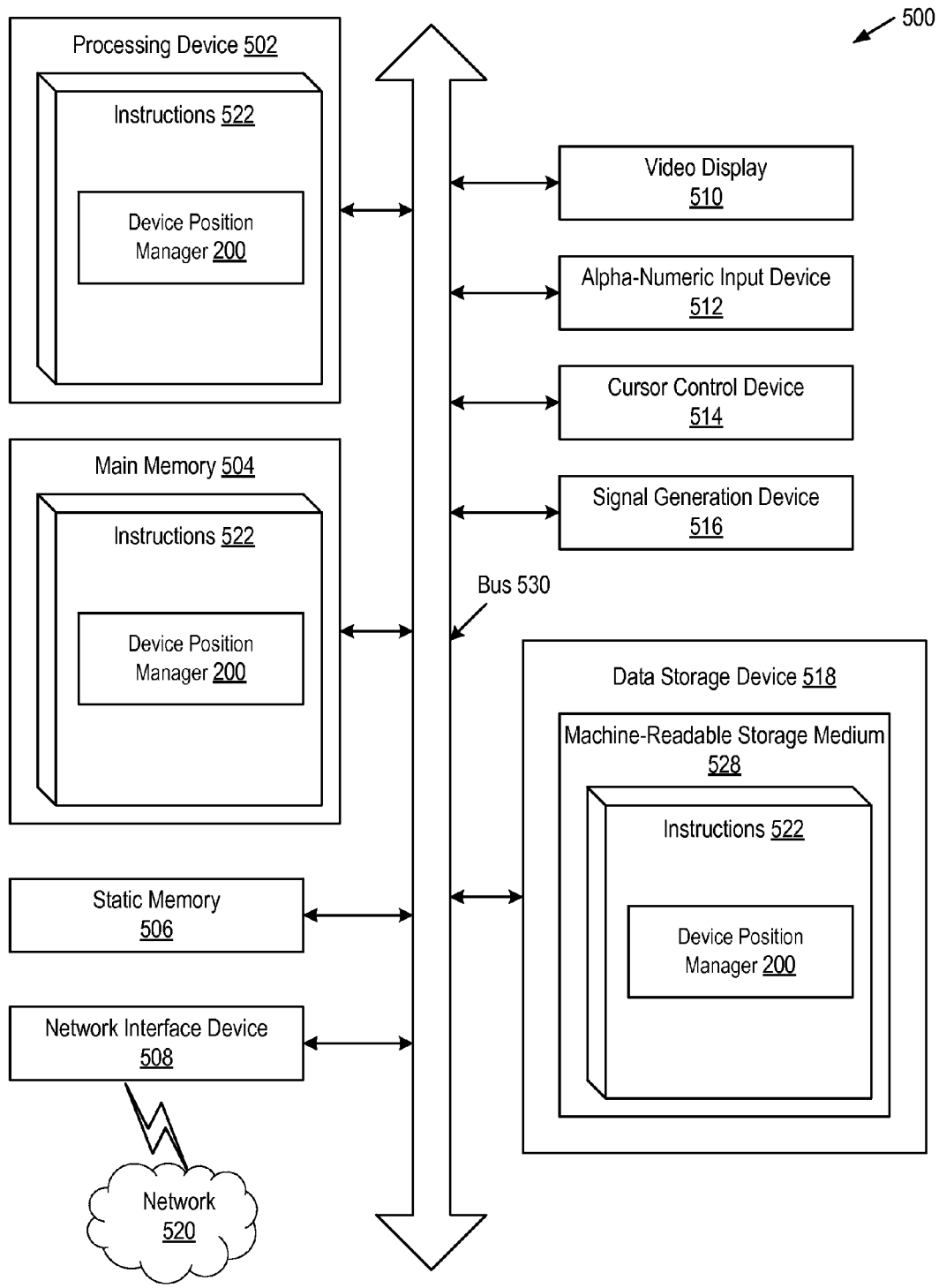
FIG. 5 is a block diagram of an example computer system that facilitates the multi-directional content capture on mobile devices.

FIG. 5 illustrates a diagrammatic representation of a machine in the exemplary form of a computing system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can be configured to execute the device position manager 200 for performing the operations and steps discussed herein.

Computing system 500 may further include a network interface device 508. Computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Additionally, the machine may include an image sensing module, an image capture device, a hardware media encoder/decoder and/or a graphics processor (GPU). The image sensing module can include an image sensor. An image sensor is a device that converts an optical image or images into an electronic signal. The image sensor can be a camera, CMOS, CCD. The image sensor can capture still images or motion pictures (video).

Data storage device 518 may include a machine-readable storage medium (or more specifically a computer-readable storage medium) 520 having one or more sets of instructions (e.g., device position manager 200) embodying any one or more of the methodologies of functions described herein. The device position manager 200 may also reside, completely or at least partially, within main memory 504 and/or within processing device 502 during execution thereof by computing system 500; main memory 504 and processing device 502 also constituting machine-readable storage media.

Machine-readable storage medium 520 may also be used to store the device queue manager logic persistently. While machine-readable storage medium 520 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "assigning," "generating," "presenting," "transmitting," "obtaining," "displaying," or the like, may refer to the actions and processes of a machine, a computer system, or similar electronic computing device, that manipulates and transforms data represented as physical (e.g., electronic) quantities within the machine's registers and memories into other data similarly represented as physical quantities within the machine memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this disclosure to "one implementation," or "an implementation" means that a particular feature, structure, or characteristic described in connection with the implementation is included in at least one implementation. Thus, the appearances of the phrase "in one implementation," or "in an implementation" in various places throughout this specification are not necessarily all referring to the same implementation. Furthermore, the particular features, structures, or characteristics may be combined in any suitable manner in one or more implementations.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The methods and systems described herein can be used in a wide variety of implementations, including as part of a mobile application ("app"), and can be part of photo or video-related software including a mobile operating system. Apps installed on the mobile device can access the systems and methods via one or more application programming interface (API).

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

As used herein, "media," "content," "media item," "digital media," and a "digital media item" can include an electronic file that can be executed or loaded using software, firmware or hardware configured to present the digital media item to a user. A digital media item may include a single work or a collection of works. For example, a digital media item may include a video clip or an entire video. In another example, a digital media item may include a single song or an entire album. In another example, a digital media item may include a single book, or an anthology. Additionally, a single digital media item may include, for example, an audio portion (e.g., a music album) and a written word portion (e.g., an electronic publication).

What is claimed is:

1. A method, comprising:
   in response to a user request to open a content capturing application on a mobile device, identifying a setting associated with content capturing, the setting specifying that the content capturing be automatically initiated when the mobile device is in a first position, wherein the first position is a preferred position compared to a second position;
   identifying a current position of the mobile device during a content capturing preparation stage of the open content capturing application;
   determining, by the mobile device, whether the current position of the mobile device during the content capturing preparation stage corresponds to the first position or the second position;
   in response to the current position corresponding to the second position:
     providing, by the mobile device, a prompt to instruct the user of the mobile device to move the mobile device to the first position during the content capturing preparation stage;
     determining whether the mobile device has moved from the second position to the first position; and
     automatically initiating the content capturing in response to determining that the mobile device has moved from the second position to the first position; and
   in response to the current position corresponding to the first position, automatically initiating the content capturing without providing the prompt during the content capturing preparation stage.

2. The method of claim 1, wherein the content is at least one of audio, video, or an image.

3. The method of claim 1 further comprising:
   blocking a content capturing capability on the mobile device in response to the current position of the mobile device corresponding to the second position.

4. The method of claim 3 further comprising:
   identifying a change in the current position of the mobile device from the second position to the first position; and
   unblocking the content capturing capability on the mobile device.

5. The method of claim 4, wherein the change in the current position of the mobile device is a rotation from the second position to the first position.

6. The method of claim 4, wherein identifying the change in the current position of the mobile device comprises:

identifying a reference point for the current position of the mobile device using a content capture component of the mobile device;
monitoring the reference point using the content capture component of the mobile device; and
identifying a deviation from the reference point.

7. The method of claim 4 wherein identifying the change in the current position of the mobile device from the second position to the first position comprises:
detecting a rate of change in the current position of the mobile device; and
modifying a predefined content capturing property in response to the rate of change exceeding a threshold.

8. The method of claim 1 further comprising:
modifying an aspect ratio of the content in response to capturing the content by the mobile device in the second position.

9. A system comprising:
a memory; and
a processing device operatively coupled with the memory to:
in response to a user request to open a content capturing application on a mobile device, identify a setting associated with content capturing, the setting specifying that the content capturing be automatically initiated when the mobile device is in a first position, wherein the first position is a preferred position compared to a second position;
identify a current position of the mobile device during a content capturing preparation stage of the open content capturing application;
determine whether the current position of the mobile device during the content capturing preparation stage corresponds to the first position or the second position;
in response to the current position corresponding to the second position:
provide a prompt to instruct the user of the mobile device to move the mobile device to the first position during the content capturing preparation stage;
determine whether the mobile device has moved from the second position to the first position; and
automatically initiate the content capturing in response to determining that the mobile device has moved from the second position to the first position; and
in response to the current position corresponding to the first position, automatically initiate the content capturing without providing the prompt during the content capturing preparation stage.

10. The system of claim 9, wherein the content is at least one of audio, video, or an image.

11. The system of claim 9, the processing device further to:
block a content capturing capability on the mobile device in response to the current position of the mobile device corresponding to the second position.

12. The system of claim 11, the processing device further to:
identify a change in the current position of the mobile device from the second position to the first position, wherein the change in the current position of the mobile device is a rotation from the second position to the first position; and
unblock the content capturing capability on the mobile device.

13. The system of claim 12, wherein to identify the change in the current position of the mobile device from the second position to the first position, the processing device to:
identify a reference point for the current position of the mobile device using a content capture component of the mobile device;
monitor the reference point using the content capture component of the mobile device; and
identify a deviation from the reference point.

14. The system of claim 12, wherein to identify the change in the current position of the mobile device from the second position to the first position, the processing device to:
detect a rate of change in the current position of the mobile device; and
modify a predefined content capturing property in response to the rate of change exceeding a threshold.

15. A non-transitory computer readable storage medium encoding instructions thereon that, in response to execution by a processing device, cause the processing device to perform operations comprising:
in response to a user request to open a content capturing application on a mobile device, identifying a setting associated with content capturing, the setting specifying that the content capturing be automatically initiated when the mobile device is in a first position, wherein the first position is a preferred position compared to a second position;
identifying a current position of the mobile device during a content capturing preparation stage of the content capturing application;
determining whether the current position of the mobile device during the content capturing preparation stage corresponds to the first position or the second position;
in response to the current position corresponding to the second position:
providing a prompt to instruct the user of the mobile device to move the mobile device to the first position during the content capturing preparation stage;
determining whether the mobile device has moved from the second position to the first position; and
automatically initiating the content capturing in response to determining that the mobile device has moved from the second position to the first position; and
in response to the current position corresponding to the first position, automatically initiating the content capturing without providing the prompt during the content capturing preparation stage.

16. The non-transitory computer readable storage medium of claim 15, wherein the content is at least one of audio, video, or an image.

17. The non-transitory computer readable storage medium of claim 15 further comprising:
blocking a content capturing capability on the mobile device in response to the current position of the mobile device corresponding to the second position.

18. The non-transitory computer readable storage medium of claim 17, the processing device further to perform operations comprising:
identifying a change in the current position of the mobile device from the second position to the first position; and
unblocking the content capturing capability on the mobile device.

19. The non-transitory computer readable storage medium of claim 18, wherein to identify the change in the current position of the mobile device from the second position to the first position, the processing device further to perform operations comprising:
    identifying a reference point for the current position of the mobile device;
    monitoring the reference point of the mobile device; and
    identifying a deviation from the reference point.

20. The non-transitory computer readable storage medium of claim 18, wherein to identify the change in the current position of the mobile device from the second position to the first position, the processing device further to perform operations comprising:
    detecting a rate of change in the current position of the mobile device; and
    modifying a predefined content capturing property in response to the rate of change exceeding a threshold.

* * * * *